United States Patent [19]

Kao

[11] Patent Number: 5,400,676
[45] Date of Patent: Mar. 28, 1995

[54] BICYCLE HANDLEBAR STEM MOUNTING DEVICE

[76] Inventor: Yu-Chen Kao, 2, Alley 1, Lane 29, Sec. 2, Pei-Shin Rd., Shin-Tien City, Taipei Hsien, Taiwan, Prov. of China

[21] Appl. No.: 166,105

[22] Filed: Dec. 14, 1993

[51] Int. Cl.$^6$ .............................................. B02K 21/12
[52] U.S. Cl. ................................. 74/551.1; 280/279; 280/276; 403/24
[58] Field of Search .................... 74/551.1–551.8; 280/279, 280, 278, 276; 403/24

[56] References Cited

U.S. PATENT DOCUMENTS

| | | | |
|---|---|---|---|
| 4,068,858 | 1/1978 | Harrison et al. | 74/551.1 |
| 4,167,352 | 9/1979 | Pletscher | 74/551.1 |
| 4,252,335 | 2/1981 | Brenner | 280/278 X |
| 4,310,260 | 1/1982 | Katayama | 74/551.1 |
| 5,003,839 | 4/1991 | Yang | 74/551.1 |
| 5,085,063 | 2/1992 | Van Dyke et al. | 74/551.1 |
| 5,095,770 | 3/1992 | Radar | 403/24 X |
| 5,269,550 | 12/1993 | Hon et al. | 280/279 X |
| 5,319,993 | 6/1994 | Chiang | 74/551.1 |

FOREIGN PATENT DOCUMENTS 2397316  3/1979  France ........................ 74/551.1

*Primary Examiner*—Vinh T. Luong
*Attorney, Agent, or Firm*—Bacon & Thomas

[57] ABSTRACT

A bicycle handlebar stem mounting device which includes a handlebar stem having a hollow tapered mount at one end mounted on the head tube of a bicycle and a clamping device at an opposite end to hold a handlebar, a tapered ring fixated into the tapered mount and mounted around the head tube, a top cap covered on the tapered mount fasten a handlebar stem, an actuating disk engaged inside the tapered mount, a hollow truncated rubber cone inserted in the head tube, a screw nut received inside the truncated rubber cone, and a screw bolt screw up with the screw nut to connect the top cap, the actuating disk, and the truncated rubber cone together, wherein turning the screw bolt inwards causes the truncated rubber cone to be deformed, and therefore the truncated rubber cone firmly stops against the inside wall of the head tube.

5 Claims, 5 Drawing Sheets

BICYCLE HANDLEBAR STEM MOUNTING DEVICE

BACKGROUND OF THE INVENTION (a) Field of the Invention

The present invention relates to a bicycle handlebar stem mounting device for fastening a bicycle handlebar seem to the head tube of the frame of a bicycle which can be dismantled from the head tube of the bicycle for replacing either part thereof.

(b) Description of the Prior Art

A normal handlebar stem mounting device according to the prior art is generally comprised of a screw bolt inserted through two ratchet nuts and then screwed up with a conical nut. As the screw bolt is turned tight, the ratchet nuts are squeezed to deform, and therefore the handlebar stem is firmly fastened to the head tube. The drawback of this handlebar stem mounting device is that the ratchet nuts cannot be turned to their original shapes when they are deformed, and therefore the handlebar stem mounting device cannot be dismantled from the head tube without damaging the parts thereof. When either element of the handlebar stem mounting device is damaged, the whole assembly must be replaced.

SUMMARY OF THE INVENTION

The present invention has been accomplished to provide a bicycle handlebar stem mounting device which eliminates the aforesaid problem. It is therefore one object of the present invention to provide a bicycle handlebar stem mounting device which can be conveniently dismantled from the head tube of the bicycle after its installation for replacing either part thereof. It is another object of the present invention to provide a bicycle handlebar stem mounting device which is simple in structure and easy to install. According to one aspect of the present invention, the handlebar stem mounting device comprises a handlebar stem having a hollow tapered mount at one end mounted on the head tube of a bicycle and a clamping device at an opposite end to hold a handlebar, a tapered ring fitted into the tapered mount and mounted around the head tube, a top cap covered on the tapered mount an actuating disk engaged inside the tapered mount, a hollow truncated rubber cone inserted in the head tube, a screw nut received inside the truncated rubber cone, and a screw bolt threaded with the screw nut to connect the top cap, the actuating disk, and the truncated rubber cone together. According to another aspect of the present invention, turning the screw bolt inwards causes the truncated rubber cone to be deformed, and therefore the truncated rubber cone firmly engages against the inside wall of the head tube. According to still another aspect of the present invention, the actuating disk has a plurality of radial grooves extending from the center hole thereof, therefore the actuating disk will be forced to deform, when the screw bolt is turned inwards after the removal of the top cap from the handlebar stem and the head tube, causing the hollow tapered mount to be lifted from the head tube for permitting all parts of the bicycle handlebar mounting device to be easily removed from the head tube.

DETAILED DESCRIPTION OF THE PREFERRED EMBODIMENT

Figure 1:
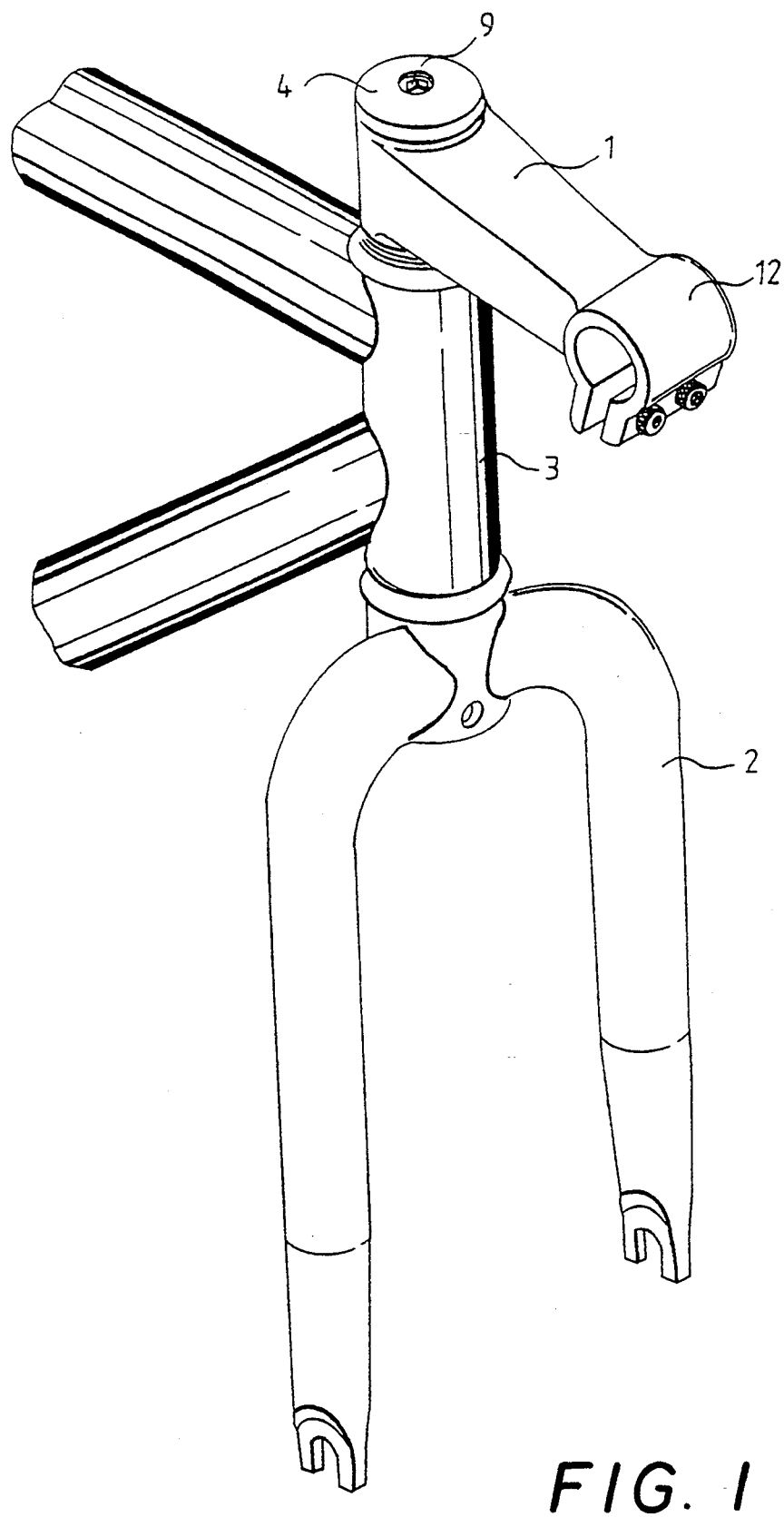
FIG. 1 is an elevational view showing the bicycle handlebar stem mounting device of the present invention installed.
Figure 2:
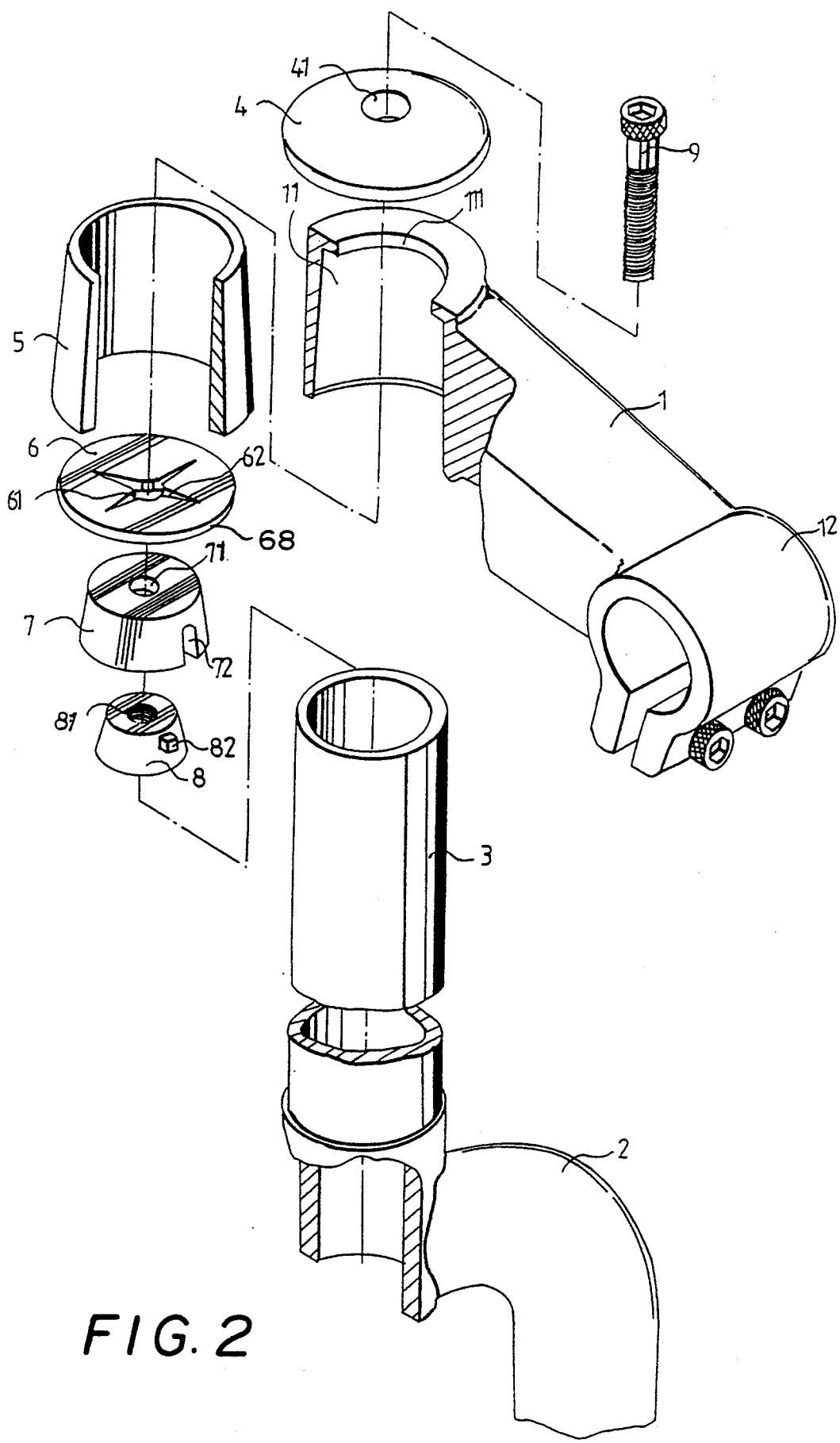
FIG. 2 is an exploded view of the bicycle handlebar stem mounting device shown in FIG. 1.

Referring to FIGS. 1 and 2, a handlebar stem 1 is provided having a unitary tubular mount 11 at one end mounted around the head tube 3 of the frame of a bicycle above the front fork 2, and a clamping device 12 at an opposite end for holding a bicycle handlebar. The tubular mount 11 has an inner diameter gradually diverging outwardly toward the bottom 109 thereof. An inward annular flange 111 is made on the tubular mount 11 at the top 110 thereof. The tubular mount 11 of the handlebar stem 1 is fastened to the lead tube 3 at the top by a top cap 4, a taper ring 5, an actuating disk 6, a hollow truncated rubber cone 7, and a screw bolt 9.

Figure 3:
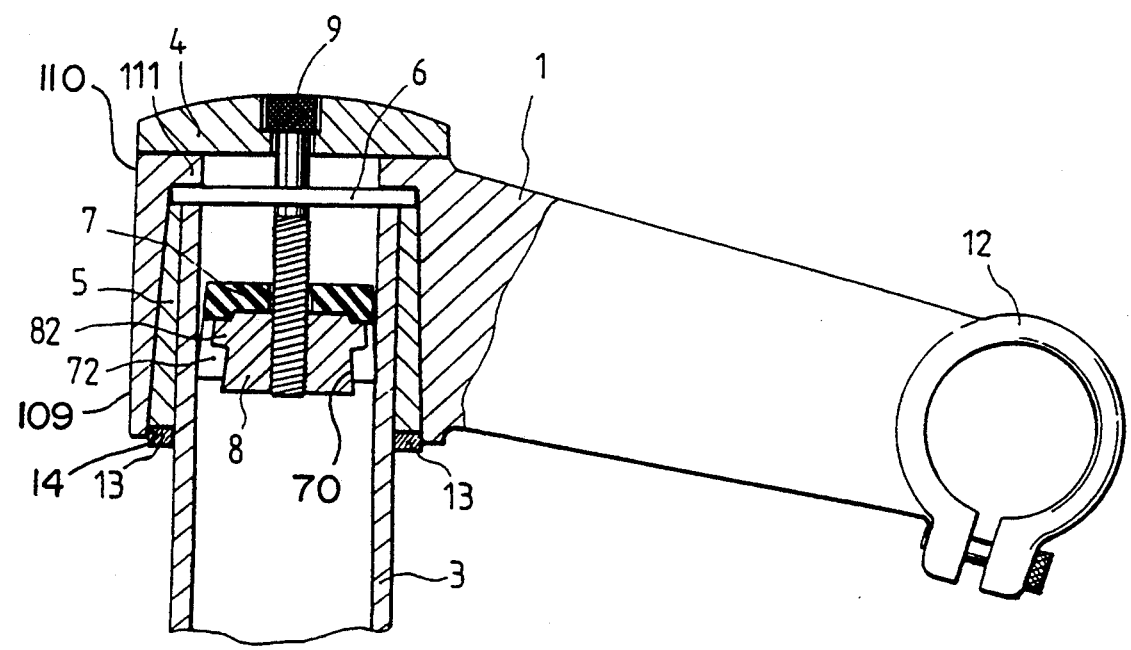
FIG. 3 is a partial sectional view of the bicycle handlebar stem mounting device of FIG. 1.

Referring to FIG. 3 and FIG. 2 again, the top cap 4 covers over the inward annular flange 111 of the tubular mount 11 of the handlebar stem 1 and the head tube 3, and has a countersunk hole 41 in the center. The taper ring 5 fits into the inner diameter of the tubular mount 11. When the taper ring 5 is fitted into the inner diameter of the tubular mount 11, it becomes tightly retained to the tubular mount 11 on the inside, and then the taper ring 5 is mounted around the head tube 3. The actuating disk 6 is made of a thin, flat plate inserted into the tubular mount 11 of the handlebar stem 1 and secured between the inward annular flange 111 of the tubular mount 11 and the taper ring 5, and includes a center through hole 61 and radial grooves 62 extending outwardly from the center hole 61. Each radial groove 62 is of a substantially triangular shape gradually narrowing toward the periphery 68 of the actuating disk 6. The hollow truncated rubber cone 7 is mounted inside the head tube 3, and includes a conical bottom chamber 70, a center through hole 71 in vertical communication with the conical bottom chamber, and two opposite side openings 72 in horizontal communication with the conical bottom chamber horizontally. The screw nut 8 fits into the conical bottom chamber 70 of the hollow truncated rubber cone 7, and includes a threaded center hole 81 vertically aligned with the center through hole 71 of the truncated rubber cone 7 and the center through hole 61 of the actuating disk 6, and two opposite horizontal rods 82 respectively inserted into the side openings 72 on the truncated rubber cone 7. The screw bolt 9 is inserted through the countersunk hole 41 on the top cap 4, the center through hole 61 on the actuating disk 6, and the center through hole 71 on the truncated rubber cone 7, and then threaded into the threaded center hole 81 on the screw nut 8. When the screw bolt 9 is turned in one direction, the screw nut 8 is forced to squeeze the truncated rubber cone 7 causing the truncated rubber cone 7 to deform, and therefore the truncated rubber cone 7 firmly engages against the inside wall of the head tube 3 (see FIG. 3). Further, a packing ring 13 is mounted around the head tube 3 and fitted into the gap 14 defined by the head tube 3, the tubular mount 11 and the taper ring 5.

Figure 4:
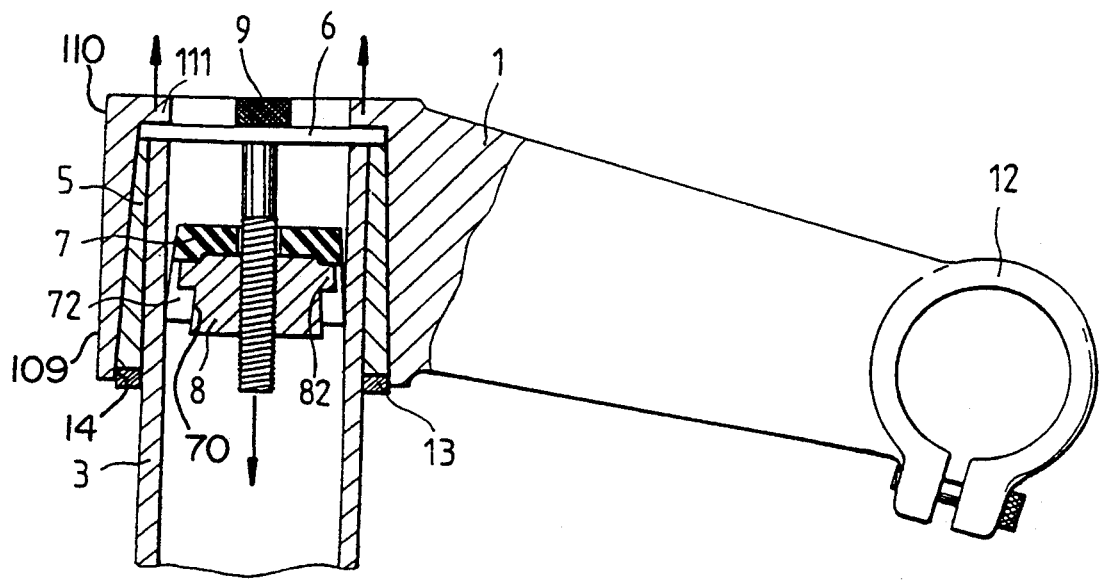
FIG. 4 is similar to FIG. 3 but showing the top cap removed.
Figure 5:
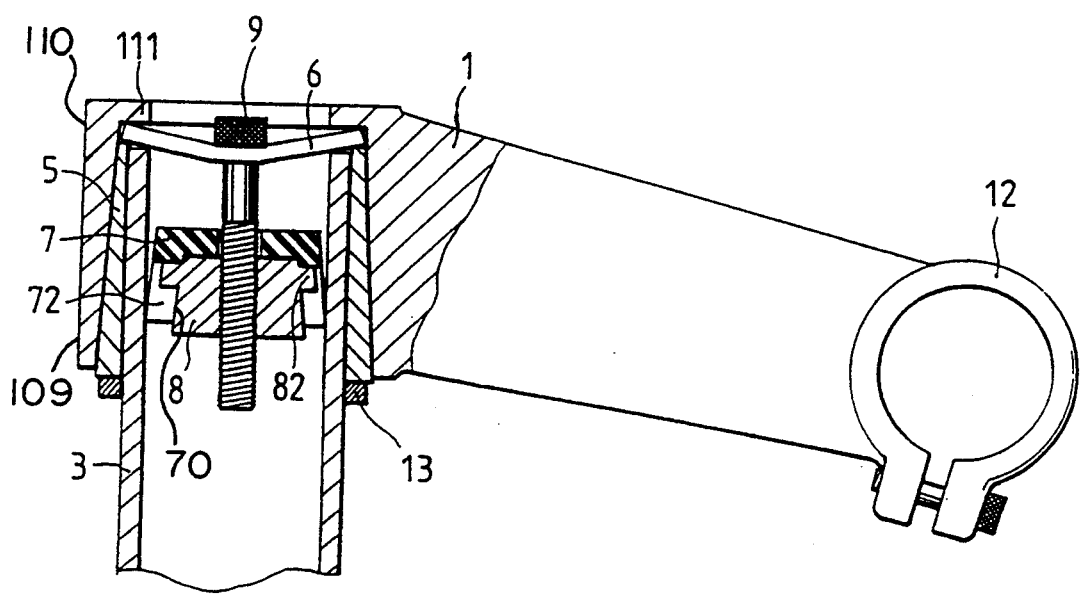
FIG. 5 is similar to FIG. 4 but showing the actuating disk deformed.

The aforesaid assembly can be conveniently loosened and dismantled from the head tube 3. The dismantling process is outlined hereinafter with reference to FIGS. 4 and 5. The screw bolt 9 is loosened and removed from all members, then the top cap 4 is removed from tile tubular mount 11 of the handlebar stem 1. Then, the screw bolt 9 is inserted through the center through hole 61 on the actuating disk 6 and the center through hole 71 on the truncated rubber cone 7 and then threaded into the threaded center hole 81 on the screw nut 8 (see FIG. 4). When the screw bolt 9 is continuously threaded inwards (downwards), the actuating disk 6 is forced to deform, causing the tubular mount 11 to be lifted from the taper ring 5 (see FIG. 5) and the head tube 3, and therefore the handlebar stem 1, the taper ring 5, and the packing ring 13 can be easily removed from the head tube 3 one after another.

Figure 6:
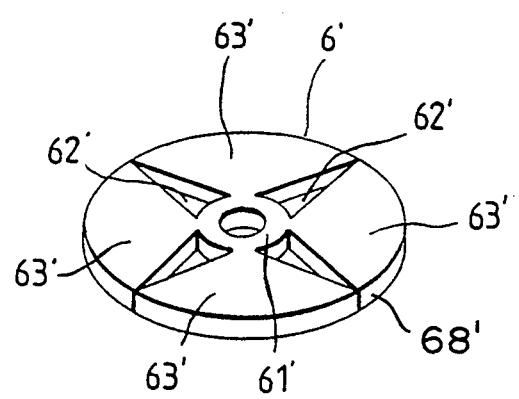
FIG. 6 shows an alternate form of the actuating disk according to the present invention.

Referring to FIG. 6, therein shown is an alternate form of the actuating disk. The actuating disk, referenced by 6', comprises a center ring 61' and a plurality of sector plates 63' connected to the center ring 61' and separated by radial openings 62'. The radial openings are made gradually narrower toward the periphery 68' of the actuating disk 6'. When the screw bolt 9 is threaded downwards to apply pressure to the actuating disk 6', the actuating disk 6' will be forced to deform and cause the sector plates 63' to project upwards in lifting the tubular mount 11 from the taper ring 5 and the head tube 3, and therefore the handlebar stem 1, the taper ring 5, and the packing ring 13 can be easily removed from the head tube 3 one after another.

What is claimed is:

1. A bicycle handlebar stem mounting device comprising:
   a) a handlebar stem including first land second opposite ends, a unitary tubular mount at the first end for mounting on the head tube of a bicycle and a clamping device at the second end for mounting a bicycle handlebar, the tubular mount including a top portion, a bottom portion, an inner diameter that gradually diverges outwardly from the top portion toward the bottom portion for mounting around the head tube, and an inwardly directed annular flange at the top portion;
   b) a top cap for covering the top portion of the tubular mount, the top cap including a countersunk hole in the center thereof;
   c) a taper ring receivable within the inner diameter of the tubular mount from the bottom portion thereof for mounting around the held tube;
   d) an actuating disc for insertion between the annular flange of the tubular mount and an upper end of the taper ring, the actuating disc including a center through hole;
   e) a hollow truncated rubber cone for disposition within the head tube, the rubber cone including a conical bottom chamber and a center through hole;
   f) a screw nut disposable within the conical bottom chamber of the rubber cone; and
   g) a screw insertable through the countersunk hole of the top cap, the center through hole of the actuating disc and the center through hole of the rubber cone for threaded engagement with the screw nut.

2. The mounting device of claim 1, wherein the actuating disc further includes a plurality of grooves extending radially outwardly from the center through hole thereof.

3. The mounting device of claim 1 further including a packing ring for mounting within a gap defined by the head tube, bottom portion of the tubular mount, and a bottom end of the taper ring.

4. The mounting device of claim 1 wherein the rubber cone further includes a pair of side openings extending to a bottom thereof, and the screw nut further includes a pair of horizontal rods receivable within the side openings.

5. The mounting device of claim 1 wherein the actuating disc further includes a center ring for receiving the screw bolt therethrough, a plurality of sector plates and a plurality of openings extending radially outwardly from the center ring, with each radial opening separating two adjacent sector plates.

* * * * *